Patented Jan. 4, 1949

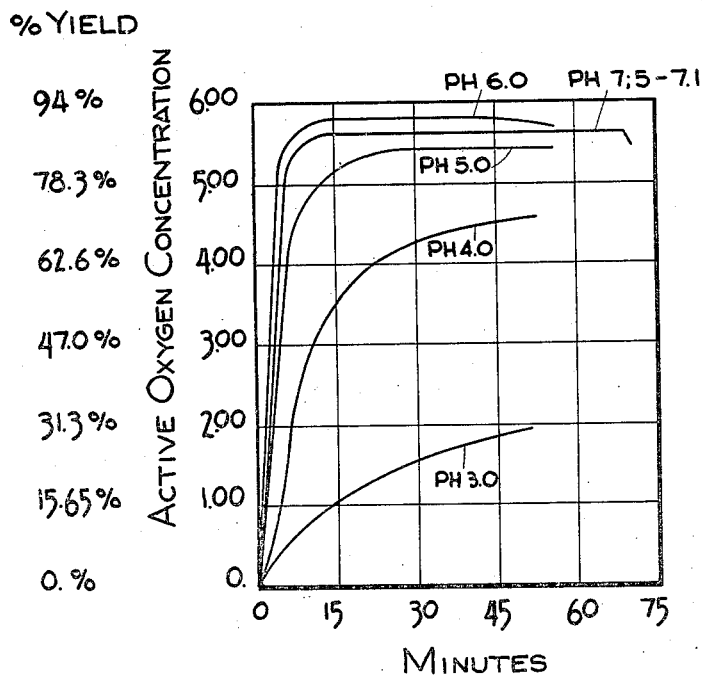

2,458,207

UNITED STATES PATENT OFFICE 2,458,207

METHOD OF MANUFACTURING ACETYL PEROXIDE

Hans A. Rudolph, Buffalo, and Robert L. McEwen, Williamsville, N. Y., assignors to Buffalo Electro-Chemical Company, Inc., Tonawanda, N. Y.

Application October 12, 1944, Serial No. 558,448

4 Claims. (Cl. 260—610)

The present invention relates to a method of preparing acetyl peroxide under controlled conditions of acidity and under conditions where the explosive hazard is eliminated.

Acetyl peroxide finds special application as a chemical reagent in the treatment of certain types of organic materials and especially as an aid in producing polymerization and resin formation from monomers. Due to its violently explosive nature, acetyl peroxide has not gone into commercial use in these fields irrespective of its excellent action therein, by reason of the hazards attending its preparation and subsequent handling.

Many methods have been suggested heretofore for the preparation of acetyl peroxide. One was to react acetic anhydride with aqueous inorganic peroxides. This reaction was best carried out in the presence of a mutual solvent. One of the earlier directions for the preparation of acetyl peroxide is that of Gambarjian, Berichte 42, 4010. The product was also prepared in small yield by reacting acetic anhydride and 100% hydrogen peroxide. Other special methods have also been described but none of the published methods lends itself to the commercial production of acetyl peroxide due either to the extremely low yield of end product or the explosive hazard attending the production thereof. Where miscible solvents have been used as a reaction medium, the hazard has been rather increased than decreased since such solvent, generally ether, had to be distilled from the highly oxidizing and highly explosive solid.

It is an object of the present invention to prepare acetyl peroxide in good yields and under non-explosive conditions.

It is also an object to provide a method suitable for producing acetyl peroxide under controllable conditions permitting production of the end product in exceptional yields.

It is also an object of the present invention to produce acetyl peroxide in a medium wherein the explosive nature of acetyl peroxide is substantially eliminated and, further, to produce a resultant peroxide product capable of being handled and transported.

In accordance with the present invention, acetyl peroxide is prepared by reacting acetic anhydride and an aqueous solution of hydrogen peroxide and an alkali in the presence of a non-mutual solvent but one in which the resultant acetyl peroxide is soluble with production of a non-explosive non-aqueous final mixture. To this end, the inert solvent as, for instance, dimethylphthalate or other water insoluble ester of phthalic acid, is employed in the reaction mixture to remove the acetyl peroxide as fast as the latter is formed from the reacting chemicals. The reacting chemicals, acetic anhydride, hydrogen peroxide and an alkali are in such amounts and of such nature as to produce a controlled hydrogen ion concentration in the mixture and within the ranges about pH 4.0 to 8. The inert non-mutual solvent selected is one in which acetic anhydride may be soluble, one in which acetyl peroxide is soluble and one in which water is relatively insoluble.

In addition to the selection of such a condition for the reaction, other conditions of the reaction must also be controlled in order to obtain reproduceable high yields of acetyl peroxide; namely, maintenance of the reaction mixture at low temperature in order to keep at a minimum the decomposition of the formed acetyl peroxide by hydrolysis. Furthermore, maintenance of low temperature prevents the hydrolysis of the acetic anhydride to acetic acid.

The time in which the reaction is to take place should be maintained at a minium in order further to reduce loss by hydrolysis of the formed acetyl peroxide whereby the quality of the latter is maintained at a high standard uncontaminated with products of decomposition of the hydrolyzate. By controlling within specified limits of the pH of the reaction mixture, the deleterious action of the locally high hydroxyl ion upon the acetyl peroxide is reduced to a minimum. In accordance with the present invention the pH of the mixture should be maintained within the limits of about pH 4.0 to pH 8. If the pH falls below about pH 4.0 extremely low yields are obtained in a given itme, or extended periods of time are required to complete the reaction but, in such extended periods, the hydrolytic decomposition of the acetyl peroxide is very marked. At too high a pH, the hydrolytic action on both the acetyl peroxide and the acetic anhydride prevents the recovery of any substantial amount of acetyl peroxide.

The following examples illustrate the principles of the invention:

*Example No. 1*

314.0 g. of technical grade acetic anhydride (97.5%) was blended with 224.0 g. dimethylphthalate, and 187.0 g. of $H_2O_2$ 100 volume below 0° C. A 23.0% $Na_2CO_3$ solution was added with agitation while the reaction mixture was externally cooled. The temperature rose to 34.5° C.

and gradually dropped to 5° C. The total reaction time was 14 minutes, and the final pH was 6.0. The reaction mixture was agitated for 5 minutes and the temperature was then 0° C. The pH was still 6.0. The dimethylphthalate was separated from the water layer at 0–5° C., dried with 25 g. anhydrous Na₂SO₄ with frequent shaking for 30 minutes, and filtered. The filter was rinsed with 30 g. of dimethylphthalate and combined with the bulk of the product.

402.5 g. of the solution of acetyl peroxide in dimethylphthalate was obtained. This solution contained 5.475% active oxygen total and 0.032% active oxygen as peracetic acid. This corresponds to 5.44% active oxygen as acetyl peroxide or a 40.1% solution of acetyl peroxide in dimethylphthalate. The yield was 91.2% of theory based on acetic anhydride.

Example No. 2

312 g. of technical grade acetic anhydride was blended with 224 g. dimethylphthalate and 187.0 g. $H_2O_2$ 100 volume below 0° C. A precooled 12.0% solution of NaOH was added with agitation while the reaction mixture was externally cooled. The temperature rose to 18° C. and gradually dropped to 2° C. within 23 minutes. The final pH was 6.50 and after 15 minutes additional agitation the temperature was −7° C. and the pH 6.45. The dimethylphthalate was separated from the water layer at −5° C. to 0° C., dried with 25 g. of Na₂SO₄ anhydrous with shaking for 30 minutes, filtered through a glass fritted filter under suction, the filter being rinsed with 30 g. dimethylphthalate and combined with the bulk of the product.

377.0 g. of the solution of acetyl peroxide in dimethylphthalate were obtained. This solution contained 5.00% active oxygen total, and 0.10% active oxygen as peracetic acid. This corresponds to 4.90% active oxygen as acetyl peroxide or a 36.15% solution of acetyl peroxide in dimethylphthalate. The yield was 77.0% of theory based on acetic anhydride.

Example No. 3

312.0 g. of technical grade (98%) acetic anhydride was blended with 224.0 g. dimethylphthalate and 187.0 g. $H_2O_2$ 100 volume at −6° C. 250 g. of a 20.0% sodium acetate solution was added with agitation while the reaction mixture was externally cooled. The temperature rose to 10° C. and dropped in 10 minutes to 1° C. After 15 minutes additional agitation, the temperature was −4° C. and the pH 3.90. The dimethylphthalate was separated from the water layer at −5 to 0° C., dried with 25 g. anhydrous Na₂SO₄ with frequent shaking for 30 minutes; filtered and rinsed as in Example No. 2.

437.5 g. of the acetyl peroxide solution in dimethylphthalate was obtained. This solution contained 4.31% active oxygen as acetyl peroxide. This corresponds to a 31.8% solution of acetyl peroxide in dimethylphthalate. The yield was 78.5% of theory based on the acetic anhydride.

In the drawing:

Fig. 1 is a graph showing the relationship of reaction time to percent of acetyl peroxide in solvent and yield of acetyl peroxide based on acetic anhydride at different pH's.

It will be understood that the reactions were carried out in comparable sized batches to eliminate variations caused by different rates of cooling encountered by employing containers of different size or of different materials. It will be noted that the optimum yields are obtained in short periods of time within the pH range 4.0 to 7.5, as shown in Fig. 1.

In carrying out the procedure, the alkali is added slowly and in small increments to the reaction mixture under agitation and cooling. The evolution of carbon dioxide from the carbonate, when the latter is employed as the alkali, aids in agitating the mixture. By adding the alkali to the mixed acetic anhydride and peroxide mixture, local hydrolysis is avoided and the yield increased.

Example No. 4 (A–E)

312 g. of technical grade acetic anhydride (97.5%) was blended with 188 cc. of dimethylphthalate and 170 cc. of $H_2O_2$ 100 volume was added below 0° C. A 24.75% sodium carbonate solution was added with agitation, while the reaction mixture was externally cooled. The reaction temperature varied for each of parts A–E according to the amount of sodium carbonate solution which was added to reach the desired pH.

The reaction time for each part was as follows:

| | Minutes |
|---|---|
| A | 6 |
| B | 6 |
| C | 10 |
| D | 11 |
| E | 13 |

The final resulting pH's were as follows:

| | |
|---|---|
| A | 2.9 |
| B | 4.0 |
| C | 5.0 |
| D | 6.0 |
| E | 7.55 |

At the time the final pH's were made, the temperature of each experiment was as follows:

| | °C |
|---|---|
| A | 4 |
| B | 5 |
| C | 9 |
| D | 5 |
| E | 4 |

The dimethylphthalate was then separated from the water layer, dried with anhydrous Na₂SO₄ with frequent shaking and filtered.

As the experiments of Example 4 were undertaken merely to show the dependency of the yield on pH, the values have only relative significance. Yields of better than 90% can be obtained regularly as shown by other experiments.

Although dimethylphthalate has been illustrated above as a preferred non-mutual solvent, other esters in which water is not soluble but in which acetyl peroxide is soluble may be employed in the reaction, it being understood that maintenance of the pH within the range 4.0 to 7.5, and a short reaction time are important factors in the procedure.

Example No. 5

314.0 g. technical grade acetic anhydride (97.5%) was blended with 224 g. diethylphthalate and 187.0 g. $H_2O_2$ 100 volume below 0° C.

A 23% $Na_2CO_3$ solution was added with agitation while the reaction mixture was cooled externally. The temperature rose to 30° C. and gradually dropped to 8° C. The total reaction time was 11 minutes, and the final pH was 6.0. The reaction mixture was agitated for 5 more minutes, and the temperature was then 2.5° C. The solution of acetyl peroxide in diethylphthalate was separated from the water layer, dried with 25 g. anhydrous $Na_2SO_4$ with frequent shaking for 30 minutes and filtered.

The filter was rinsed with 25 g. diethylphthalate and combined with the bulk of the product.

408 g. of the solution of acetyl peroxide in diethylphthalate was obtained. This solution contained 5.39% active oxygen total and 0.04% active oxygen as peracetic acid. This corresponds to 5.35% active oxygen as acetyl peroxide, or a 39.5% solution of acetyl peroxide in diethylphthalate. The yield was 91.1% of theory based on acetic anhydride.

Example No. 6

The procedure was the same as that described under diethylphthalate. 226 g. dibutylphthalate was used; all other chemicals are the same.

The maximum temperature was 31° C. which dropped to 4° C.; the total reaction time was 12 minutes; the after reaction time, 5 minutes. The pH obtained was 6.0.

The obtained product proved to be partially solidified. Therefore, another 158 g. dibutylphthalate had to be added in order to obtain a solution at the temperature of +10° C. 561 g. of dried product were obtained.

The total active oxygen was 3.92%; active oxygen as acetic peracid was 0.02%, corresponding to 3.90% active oxygen for acetyl peroxide, or a 28.75% solution of acetyl peroxide in dibutylphthalate. This represents approximately the maximum concentration of an acetyl peroxide solution in dibutylphthalate at 10° C.

The yield was 91.1% of theory, based on acetic anhydride.

Example No. 7

314.0 g. acetic anhydride technical grade was blended with 225 g. dibutyl sebacate and 187.0 g. $H_2O_2$ 100 volume below 0° C. The procedure is the same as that described under diethylphthalate.

The maximum temperature was 32° C. which dropped to 7° C. The total reaction time was 16 minutes, and the final pH was 6.0. The after reaction time was 2 minutes and the temperature then, 8° C.

The obtained product was partially solidified so that more dibutyl sebacate had to be added to obtain a complete solution at 11° C.

The solution of acetyl peroxide in dibutyl sebacate was separated from the water layer, (In this case the solution rises to the top; therefore, it has a lower density than the water layer.), dried with 50 g. of anhydrous $Na_2SO_4$ and filtered.

616 g. of a solution of acetyl peroxide in dibutyl sebacate was obtained. This solution contained 3.57% active oxygen total and 0.02% active oxygen as peracetic acid.

This corresponds to 3.55% active oxygen as acetyl peroxide, or a 26.2% solution of acetyl peroxide in dibutyl sebacate. The yield was 91.1% of theory, based on acetic anhydride.

Example No. 8

Tricresyl phosphate is not as good a solvent for acetyl peroxide as certain of the solvents previously enumerated. It gives a cloudy solution at a concentration of 28.5% acetyl peroxide. 225 g. tricresyl phosphate were blended with 314 g. acetic anhydride and 187 g. $H_2O_2$ 100 volume, and the $Na_2CO_3$ solution was added in the known manner. The maximum temperature was 35° C.; the final pH, 6.0; the end temperature was +5° C., and the total reaction time was 14 minutes. It was found then that probably most of the product was present in a gel like form, floating on the surface.

Considering the danger which such a comparatively large amount of acetyl peroxide represented, the greater part of the mixture was dumped and a small part of the gel was transferred to a small separatory funnel. This mixture was allowed to gain in temperature up to 17° C., during which course a gradual decrease in optical density was observed. The separated "solution," which was still hazy, was dried with $Na_2SO_4$ anhydrous and filtered. The filtered solution was still hazy but cleared considerably overnight. The total active oxygen was found to be 3.92%; the active oxygen representing peracetic acid was 0.05%. This corresponded to 3.87% active oxygen as acetyl peroxide, or a solution of 28.55% acetyl peroxide in tricresyl phosphate.

By following the procedure outlined herein, acetyl peroxide can ge obtained in good yield and without the hazard of explosion. Although dimethylphthalate has been employed as the non-mutual solvent for dissolving the formed acetyl peroxide, by reason of its desensitizing action on acetyl peroxide, other organic solvents may serve to this end, such as esters of phthalic acid and those organic solvents in which water is relatively insoluble but in which acetyl peroxide is soluble.

What is claimed is:

1. The method of preparing acetyl peroxide which comprises blending acetic anhydride and hydrogen peroxide with a liquid ester of phthalic acid and thereafter adding thereto under cooling and in successive increments sufficient of an alkali to maintain the end pH in the range 4.0 to 8.0.

2. The method of preparing acetyl peroxide which comprises blending acetic anhydride and hydrogen peroxide with dimethylphthalate and thereafter adding thereto under cooling and in successive increments sufficient of an alkali to maintain the end pH in the range 4.0 to 8.0.

3. The method of preparing acetyl peroxide which comprises blending acetic anhydride and hydrogen peroxide with dimethylphthalate and thereafter adding thereto under cooling and in successive increments sufficient of an alkali to maintain the end pH in the range 5.8 to 6.5.

4. The method of preparing acetyl peroxide which comprises blending acetic anhydride and hydrogen peroxide with dimethylphthalate and thereafter adding under cooling and in successive increments sufficient soluble carbonate to maintain the end pH in the range 4.0 to 8.0.

HANS A. RUDOLPH.
ROBERT L. McEWEN.

REFERENCES CITED

The following references are of record in the file of this patent:

UNITED STATES PATENTS

| Number | Name | Date |
| --- | --- | --- |
| 1,614,037 | McKee | Jan. 11, 1927 |
| 1,754,914 | Stoddard | Apr. 15, 1930 |
| 2,284,477 | Reichert | May 26, 1942 |

OTHER REFERENCES

Beilstein, "Handbuch der Organischen Chemie," 4th ed., vol. II, page 170.